(12) United States Patent
Cyris

(10) Patent No.: US 9,945,563 B2
(45) Date of Patent: Apr. 17, 2018

(54) VERY SHALLOW HEATING APPARATUS WITH VERY HIGH YIELD AND A WIDE VIEW

(71) Applicant: Rudy Cyris, Couvin (BE)

(72) Inventor: Rudy Cyris, Couvin (BE)

( * ) Notice: Subject to any disclaimer, the term of this patent is extended or adjusted under 35 U.S.C. 154(b) by 864 days.

(21) Appl. No.: 14/309,224

(22) Filed: Jun. 19, 2014

(65) Prior Publication Data
US 2014/0299117 A1     Oct. 9, 2014

Related U.S. Application Data

(63) Continuation of application No. PCT/EP2012/076160, filed on Dec. 19, 2012.

(30) Foreign Application Priority Data

Dec. 20, 2011  (EP) .................................... 11194696

(51) Int. Cl.
*F24B 3/00*          (2006.01)
*F24B 1/19*          (2006.01)
(Continued)

(52) U.S. Cl.
CPC ............ *F24B 1/1902* (2013.01); *F23L 15/04* (2013.01); *F24B 1/181* (2013.01); *F24B 1/185* (2013.01);
(Continued)

(58) Field of Classification Search
CPC ..... F23L 1/00; F24H 1/28; F23M 9/06; F24B 1/026; F24B 5/026; F24B 1/1808;
(Continued)

(56) References Cited

U.S. PATENT DOCUMENTS 3,363,845 A  *  1/1968  Pierce ..................... F23D 14/58
                                                       239/283
4,349,009 A     9/1982  Patterson et al.
(Continued)

FOREIGN PATENT DOCUMENTS

DE       2909539 A1   9/1979
DE       3009251 A1   9/1981
(Continued)

*Primary Examiner* — Jason Lau
(74) *Attorney, Agent, or Firm* — Reinhart Boerner Van Deuren P.C.

(57) ABSTRACT

A solid fuel heating apparatus (1) comprising a combustion chamber provided with a glass door (4) opening to the outside, an intake device (11) for the intake of outside combustion air into said chamber, an outlet duct for the burnt gases (2) and a sealed preheating enclosure for preheating the combustion air, conveying said air to the combustion chamber, connected at a first end to the intake device (11) and ending at a second end with a plurality of openings (9) releasing the air preheated by the preheating enclosure into the combustion chamber, characterized in that the preheating enclosure consists of a set of sealed heat exchanging pipes containing the combustion gases and the burnt gases (3, 8, 12, 15, 17, 18, 19), ending with the abovementioned openings (9), which are variable in size and are arranged in such a way as to modulate the flow of preheated air released into the chamber, enclosing the flame and combustion area in the natural conical shape of said chamber.

10 Claims, 11 Drawing Sheets

(51) Int. Cl.
| | |
|---|---|
| *F24B 1/181* | (2006.01) |
| *F24B 1/192* | (2006.01) |
| *F24B 1/193* | (2006.01) |
| *F24B 7/00* | (2006.01) |
| *F23L 15/04* | (2006.01) |
| *F24B 1/185* | (2006.01) |
| *F24B 1/188* | (2006.01) |
| *F24B 5/02* | (2006.01) |

(52) U.S. Cl.
CPC .............. *F24B 1/1885* (2013.01); *F24B 1/19* (2013.01); *F24B 1/192* (2013.01); *F24B 1/193* (2013.01); *F24B 5/026* (2013.01); *F24B 5/028* (2013.01); *F24B 7/005* (2013.01); *Y02E 20/348* (2013.01)

(58) Field of Classification Search
CPC ........ F24B 1/192; F24B 1/191; F24C 15/003; F24C 3/002
USPC .......................................... 126/298, 500–505
See application file for complete search history.

(56) References Cited

U.S. PATENT DOCUMENTS

| | | | |
|---|---|---|---|
| 4,370,973 A | 2/1983 | Bolanos | |
| 4,556,044 A | 12/1985 | Barsness et al. | |
| 4,724,798 A * | 2/1988 | Alspaugh | F23L 1/00 122/14.2 |
| 4,736,730 A | 4/1988 | Robertson | |
| 4,967,731 A * | 11/1990 | Terhune | F24B 1/192 126/521 |
| 5,113,843 A | 5/1992 | Henry et al. | |
| 5,249,567 A | 10/1993 | Maitland et al. | |
| 5,320,086 A | 6/1994 | Beal et al. | |
| 5,413,089 A * | 5/1995 | Andors | F24B 1/026 110/210 |
| 5,657,742 A | 8/1997 | Greenall | |
| 5,666,889 A | 9/1997 | Evens et al. | |
| 2005/0279344 A1 | 12/2005 | Cyris | |
| 2007/0044790 A1* | 3/2007 | Carlo | F24B 1/1808 126/512 |

FOREIGN PATENT DOCUMENTS

| | | |
|---|---|---|
| DE | 20201286 U1 | 5/2002 |
| EP | 0604388 A1 | 6/1994 |
| EP | 1331440 A1 | 7/2003 |
| EP | 1563228 B1 | 4/2007 |
| EP | 1985928 A1 | 10/2008 |
| FR | 2868517 A1 | 10/2005 |
| GB | 2466229 A | 6/2010 |
| WO | WO 99/64789 | 12/1999 |
| WO | WO 2011/082936 A1 | 7/2011 |

\* cited by examiner

VERY SHALLOW HEATING APPARATUS WITH VERY HIGH YIELD AND A WIDE VIEW

CROSS-REFERENCE TO RELATED PATENT APPLICATIONS

This patent application is a continuation of PCT/EP2012/076160, filed Dec. 19, 2012, which claims priority to European Application No. 11194696.8, filed Dec. 20, 2011, the entire teachings and disclosure of which are incorporated herein by reference thereto.

FIELD OF THE INVENTION

The present invention relates to the field of household heating apparatuses using solid fuel such as wood, pellets, coal, lignite briquettes, etc. and having a high yield. In their best performing versions, these apparatuses comprise means for preheating the primary air that supplies the combustion chamber.

BACKGROUND OF THE INVENTION

Home stoves have always been given a casing that recalls daily-life objects, for example with a shape inspired by a piece of furniture or a clock. Thus, several generations of stoves have followed one another with a lifetime of at least forty years each: the bell stove, the Franklin stove, the ceramics step stove, the Godin-type stove, the cabinet stove, the convection stove, the cast-iron stove, the chimney stove, etc. Currently, a new generation of stoves, namely steel stoves of contemporary style, is supplanting cast-iron stoves.

Furthermore, household heating apparatuses using solid, liquid or gas fuel currently available on the market have a shape that is generally cubic, cylindrical, trapezoidal, etc., whether they are stand-alone apparatuses or inserted into masonry or a wall. One way of giving the current stoves a contemporary design, recalling daily-life objects that are currently in style and "trendy", such as flat-screen televisions, smart phones or electronic tablets, is to make them both shallow, or even very shallow, and visually accessible from different angles, or even panoramic (FIGS. 1A and 1B).

However, the dimensions of most commercially-available stoves are often within the following limits:
height: 35-120 cm;
width: 30-100 cm;
depth: 30-70 cm.

The aforementioned dimensions, as well as the other features of current stoves, generally give them either a heavy or a bulky look, with related excess costs in terms of material, energy and handling.

These apparatuses may be very heavy and their weight may typically vary between 40 and 250 kg, depending on power. When they are inserted, these apparatuses require imposing masonry.

The depth is a particularly important parameter, since it determines the space available to fasten the door or window, and the back of the stove, as well as the size of the combustion chamber.

For example, in the case of woodstoves, it is difficult to reduce the depth of the stove given the restriction on the space available for inserting the logs, since the latter tend to pile on top of one another at the bottom of the stove and suffocate the combustion when the depth is reduced.

In general, it is observed that combustion in a narrow space using the prior-art combustion systems is not satisfactory: the yield is very average and the window quickly becomes dirty.

Until the end of the 1970s, woodstoves were supplied with fresh air coming from the grate at the bottom of the chamber, resulting in a tendency to make the stove deeper in order to avoid dirtying the window. Another solution was to suppress the windows, or to reduce them or to equip the stove with windows decorated with cast iron in order to hide the fouling.

A first way of trying to solve this problem of dirtying was to introduce fresh air along the window to create an air curtain that prevents the deposition of combustion residues and conveys them toward the rear of the chamber. However, introducing cold air or air at ambient temperature into a combustion chamber brought to a temperature of between 300 and 600° C. disrupts the combustion, and the efficiency is hence not optimized and the polluting emissions remain high.

In order to solve this problem, all (except in the startup phase) or part of the primary air introduced was preheated by contact with the hot walls of the chamber in secondary, or even tertiary, ducts, which defines a second and third combustion area (for example, see the "Woodbox"® patent—EP 1 563 228 B1, 100% primary air preheated safe startup). The stoves then become very complex and very expensive to manufacture.

Since the combustion occurs on several levels, the smoke crossing the incoming air, opening the door to reload with fuel may cause the living space to become smoky. To avoid this, it is necessary to improve the combustion by eliminating parasitic air intakes, therefore by making the chamber as sealed as possible, for example with a triple-walled loading door, which is again very expensive.

It is also difficult to reduce the depth of the prior-art stoves without significantly decreasing the volume of the combustion chamber, since a dual preheating duct for the primary air is often provided in the back and side walls of the apparatus, to promote good combustion.

In order to avoid significant dirtying at the level of the window, it is also necessary to burn "noble" wood i.e., expensive wood varieties such as oak, beech, hornbeam or birch, for example.

Several manufacturers have tried to give their heating apparatuses a "narrow" look by adding a frame around the existing apparatus. The total depth of these apparatuses, however, remains unchanged.

Furthermore, heating apparatuses working off gas are also known in which the preheating of the primary air comprises a dual enclosure that is concentric to the discharge duct for the burnt gases, which allows to recover part of the heat that is lost through the evacuation of smoke to preheat the incoming primary air.

Document EP 1 985 928 A1 describes a panoramic multi-fueled heating apparatus, where the primary air taken from outside the chamber is preheated in a dual-enclosure duct that is concentric with the hot discharge duct for the burnt gases. A heat exchanger situated in the crown of the furnace is used both as a baffle to slow down the discharge of the burnt gases and as a deflector that contributes to distributing all of the preheated air along the window(s), in the upper part of the combustion chamber.

AIMS OF THE INVENTION

The present invention aims to put on the market a new generation of household heating apparatuses that meet the current high-efficiency requirements and preferably have a depth of no more than 12-20 cm, so as to give them the look of a much more contemporary stove.

The invention also aims to provide heating apparatuses in which the surface for viewing the furnace is greatly increased relative to the state of the art.

The invention also aims to provide rotating or panoramic apparatuses to ensure optimal viewing of the furnace irrespective of the user's position in the room.

The invention also aims to solve the problem of smoke escaping during reloading through the front door.

MAIN CHARACTERISTICS OF THE INVENTION

The present invention relates to a solid-fuel heating apparatus comprising a combustion chamber provided with a windowed door opening to the outside, an intake device for receiving outside combustion air in said chamber, an output duct for the burnt gases and a sealed enclosure for preheating the combustion air conveying the latter into the combustion chamber, connected at a first end to the intake device and ending at a second end with a plurality of orifices releasing the preheated air through the preheating enclosure into the combustion chamber, the preheating enclosure being made up of a set of sealed ducts exchanging heat with the combustion gases and the burnt gases, ending with the aforementioned orifices, wherein said orifices are positioned on the one hand in lines spaced apart from one another and on the other hand have a size that decreases by height, over a distance that does not exceed the lower half of the height of the combustion chamber, so as to modulate the flow of preheated air that is released into the chamber while enveloping the flame and combustion area according to the natural conical shape thereof, and wherein the set of sealed ducts exchanging with the combustion gases and the burnt gases is arranged to comprise a duct section for preheating the combustion air that is concentric with at least one section of the discharge duct for the burnt gases and has a length comprised between 20 and 40 cm.

According to example embodiments of the invention, optionally preferred, the heating apparatus further comprises one or a suitable combination of the following features:

the concentric section of the preheating duct comprises an upper or end lid and at least two radial partitions with an opening between the end of those partitions and the lid, to create at least two cylindrical enclosure sections such that the combustion air is oriented upward, or in one direction, in a first of said sections, runs alongside the lid, then is oriented downward, or in the opposite direction, in another of said sections, while heating in thermal contact with the discharge duct for the burnt gases;

the concentric section of the preheating duct comprises on the one hand the intake device for the combustion air taken from the ambient room or outside the latter or the residence and is connected on the other hand to a dual-enclosure section at the level of non-windowed sides of the apparatus to convey the combustion air from top to bottom while continuing to preheat it until it is taken in at the bottom of the combustion chamber through said orifices;

in the bottom of the combustion chamber, the dual-enclosure section is further connected to horizontal tubes, optionally provided with fire-dogs that are also tubular, said tubes and fire-dogs (18) also being provided with intake orifices, in order to bring the preheated air into an ember bed;

the heating apparatus comprising a back and an opposite windowed face, the intake device for the combustion air is situated in the bottom of the combustion chamber and is connected to a vertical preheating duct situated in the back of the apparatus that brings in the combustion air upwards toward said concentric section of the preheating duct, from which the combustion air is oriented toward at least one dual-enclosure section at the level of at least one of the two lateral sides of the apparatus to then convey the combustion air downwards while continuing to preheat it until it is taken into the combustion chamber through said orifices;

the apparatus further comprises a plurality of ducts and baffles, to increase the length of the path taken by the burnt gases and smoke before they are discharged, in order to decrease the temperature of the smoke and increase the heat exchange with the combustion air;

the heating apparatus comprising two opposite windowed faces or a back and an opposite windowed face, the intake device for the combustion air is situated in the bottom of the combustion chamber and is connected, via a sealed dual-bottom duct, to one or several vertical preheating ducts situated at the respective corners of the apparatus and optionally to a preheating duct formed in the back of the apparatus, said duct bringing in the combustion air upwards toward said concentric section of the preheating duct, from which the combustion air is oriented towards two dual-enclosure sections at the level of the two respective lateral sides of the apparatus to then convey the combustion air downwards while continuing to preheat it until it is taken into the combustion chamber through said orifices, each of the dual-enclosure sections optionally being in a central position between two respective rising vertical ducts;

the sealed dual-bottom duct is a hollow grate comprising a lower wall provided with a intake orifice for the combustion air, a closed upper wall in thermal contact with the combustion chamber, the inside of the hollow grate comprising baffles to lengthen the path of the combustion air in the hollow grate, orifices passing all the way through the hollow grate in a sealed manner in order to allow the ashes to fall into an ash pan;

the apparatus has an essentially parallelepiped shape, with a length/depth or width/depth ratio at least greater than 3 and a windowed surface covering at least 70% of the face with the larger surface area;

the apparatus comprises access on its upper part over at least one side of the smoke-discharge duct or on at least one of its two lateral sides, for loading logs or other solid fuels;

the apparatus comprises means allowing to position logs at different heights;

said means are angle brackets or rails;

the discharge duct for the burnt gases is extended in the crown of the combustion chamber to create a rectangular exchanger or baffle section, i.e. using a horizontal plate and two vertical side plates, this exchanger section allowing to channel the smoke and combustion gases, capturing them at mid-height of the combustion chamber.

Figure 1A:
FIG. 1A shows an embodiment of a heating apparatus as in the present invention, where the height of the apparatus is greater than its width.
Figure 1B:
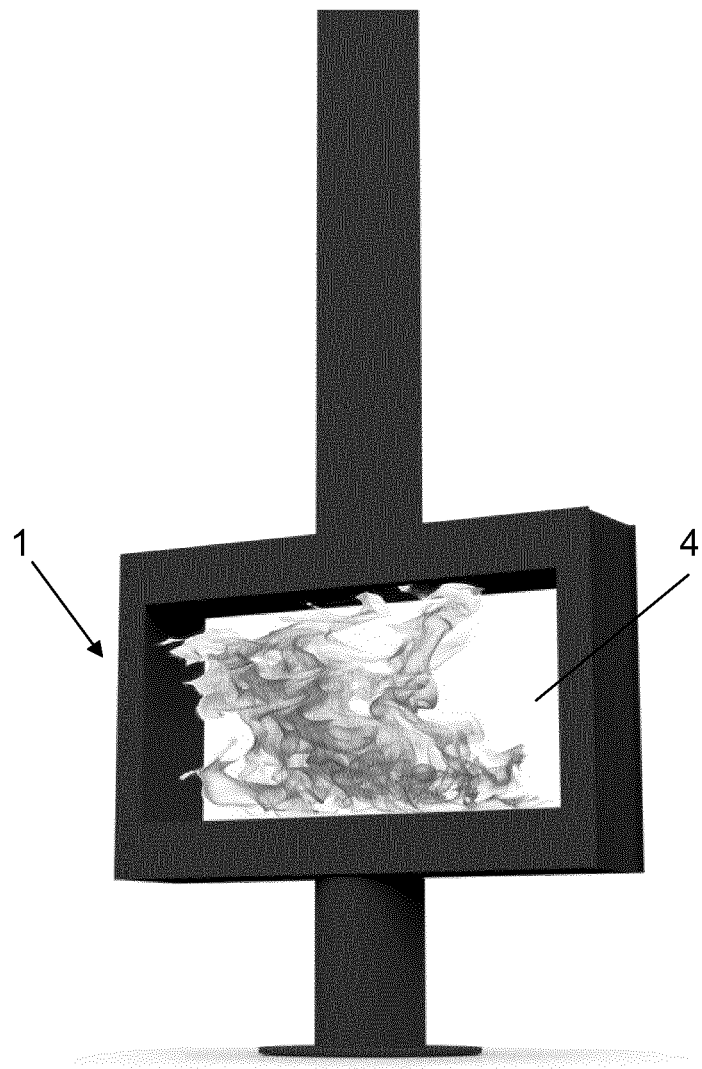
FIG. 1B shows an embodiment of a heating apparatus as in the present invention, where the height of the apparatus is smaller than its width.

DESCRIPTION OF PREFERRED
EMBODIMENTS OF THE INVENTION

The restriction imposed on a heating apparatus having at least one reduced dimension, preferably its depth, relative to the state of the art is to maintain optimal efficiency, for a given power.

This condition can be met by preheating the primary air more efficiently to increase the quality of the combustion, without there being any direct introduction of non-preheated air into the chamber any more (except to "boost" the combustion for a few seconds upon ignition or during the extinguishing phase). By conducting many tests, the Applicant discovered that, to optimize the efficiency not only of a stove with reduced depth, but also of a stove with standard dimensions, it is necessary, generally speaking, to:

preheat to a maximum the combustion air taken from the room, or even from outside the latter (so-called "primary" air) in a sealed, confined area called "preheating enclosure", and direct that preheated air toward the base of the combustion, in the lower part of the combustion chamber, using a set of sealed ducts that extend the preheating enclosure;

modulate the height of the preheated air flow, using sets of orifices with variable sizes, so as to envelop or frame the flame or the combustion according to its natural conical shape.

This configuration causes an optimal elimination of unburnt matter, and hence allows to avoid dirtying the window and the smoke-discharge duct.

Practically speaking, the constraints of the desired extended or panoramic viewing as in the invention require that the intake of combustion air, as well as the preheating thereof in the heating apparatus be achieved using a relatively limited number of possible methods:

either from the top, through a heat exchanger located in the crown (or in the upper part) of the furnace, formed by the sealed interface between a central duct section for the discharge of burnt gases on the one hand, and an outer enclosure that is concentric to that central section on the other hand, the outer enclosure serving to convey downward the combustion air taken from the ambient room or from outside the latter or outside the residence, that combustion air being then channeled from top to bottom, preferably over the entire height of the combustion chamber, through one or several sealed ducts, and released through appropriate orifices in the lower part of the combustion chamber, preferably at the base thereof, thereby enveloping the conical area made up of the flames and the combustion gases with greatly preheated air. The juxtaposition of the heat exchanger located in the crown of the furnace and the sealed ducts for conveying the preheated air as far as the base of the combustion constitutes what is referred to above as the "preheating enclosure";

or from the bottom, the combustion air being introduced into the bottom of the apparatus, then preheated using one or several sealed channel sections, for example in the form of a dual enclosure, at the level of the bottom, of both sides and/or the corners of the apparatus, depending on whether it is an apparatus with a single or dual window, then passing through the aforementioned heat exchanger at the level of the crown of the furnace, the preheated air lastly being once again channeled or forced to flow from top to bottom in the apparatus, preferably over the entire height of the combustion chamber, to be released at the level of the flames, thus once again enveloping the combustion gases with greatly preheated air.

Reference will be indifferently made herein under to "window" and "windowed door".

These methods for supplying preheated air are a prerequisite for the production of a shallow heating apparatus, as targeted by the present invention. It will, however, be noted that the principles at the basis of the invention are also applicable to an apparatus having a thickness that is greater than 20 cm.

EXAMPLE 1

Figure 2:
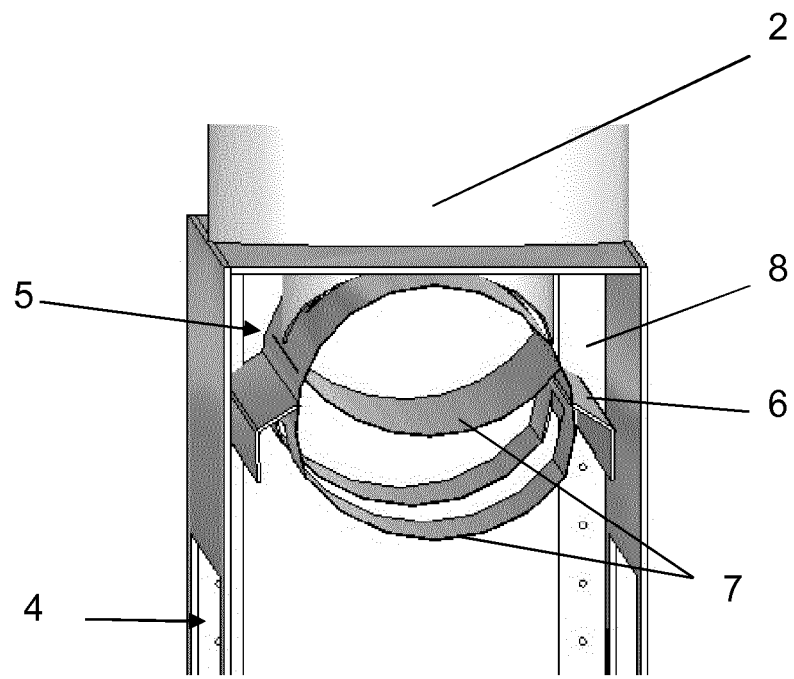
FIG. 2 shows an embodiment of the heat exchanger in a heating apparatus as in the present invention.

According to a first embodiment of the invention shown in FIG. 2, the heat exchanger 5 is located, in the crown of the combustion chamber, where the dual-enclosure chimney duct 2,3 comes into contact with the combustion chamber, i.e. at the intake for the primary air conveyed from the outside through the duct 3, this primary air being heated in contact with the hot wall of the smoke-discharge duct 2, outside the stove and in contact with the exchanger 5, inside the stove. Due to the presence of the exchanger 5 and to its particular configuration, the temperature of the preheated primary air is therefore higher. The exchanger 5 thus forms a whole with that dual duct 2,3. The exchanger 5 behaves like an obstacle or a deflector that will deflect the primary air arriving in the combustion chamber at the top of the apparatus, preferably above the flames and from top to bottom over the entire height of the combustion chamber, thus enveloping the combustion gases with greatly reheated air. This causes an optimal elimination of unburnt matter, thus allowing to avoid dirtying the window and the smoke-discharge duct. Its outer wall 6 is preferably convex and curved to facilitate a fluid flow of the combustion air, but that wall can also be made up of straight parts.

The inside of the exchanger 5 that is connected with the discharge for the burnt gases in the inner enclosure 2 of the dual-enclosure duct is advantageously provided with sections making up baffles 7 that promote the heat exchange with the outer enclosure 3. These sections may be curved (for example, steel sheet), but may also be straight if the materials used cannot be formed (for example, vermiculite).

EXAMPLE 2

Figure 3A:
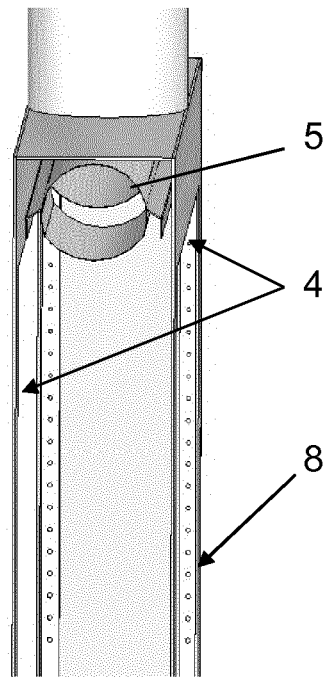
FIG. 3A shows an embodiment of the invention in the case where the apparatus comprises two windows facing each other and has tubular ducts for the intake of preheated primary air.
Figure 3B:
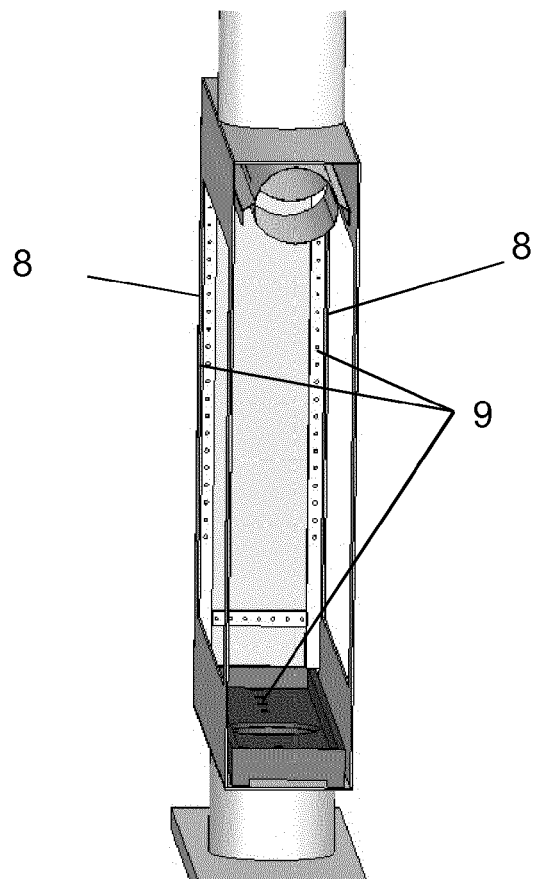
FIG. 3B corresponds to the embodiment of FIG. 3A where the connection of the tubular ducts with the bottom of the combustion chamber is shown.

According to another embodiment of the invention shown in FIGS. 3A and 3B, the stove is provided with two windows 4 facing each other (so-called "reversible" stove), and four tubular ducts 8 corresponding to the four corners of the combustion chamber are advantageously provided in order to bring the preheated air from the exchanger 5 toward the bottom of the combustion chamber. These tubular ducts may have a round, square or any other geometrical shape. It is possible to provide for and distribute orifices 9 over the entire height of these ducts 8, and preferably only in the lower half of the combustion chamber, with respective diameters increasing from the bottom up, for example, as an illustration, 1 cm, 0.75 cm and 0.5 cm, respectively. In a same row, the orifices are for example separated by 2 cm. As shown in FIG. 3B, the four ducts 8 may be, completely or partially, connected to the base 11 of the combustion chamber to bring the preheated air into the ember bed, while completely surrounding the latter, at least in the lowest part of the chamber. The orifices 9 may also be replaced by openings in rows (or slots).

EXAMPLE 3

Figure 4A:
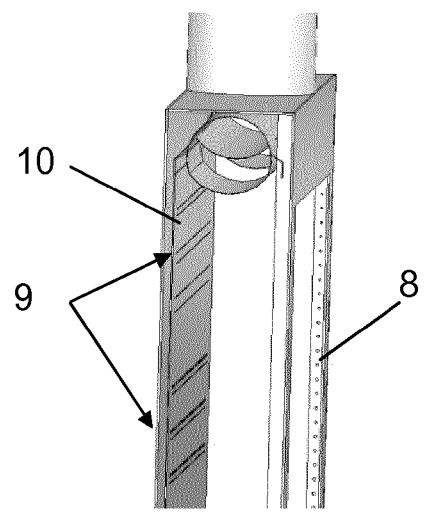
FIGS. 4A to 4C show views of an embodiment of the invention in the case where the apparatus comprises a single window and an opposite back with a dual wall for the intake of preheated air extending the exchanger.
Figure 4B:
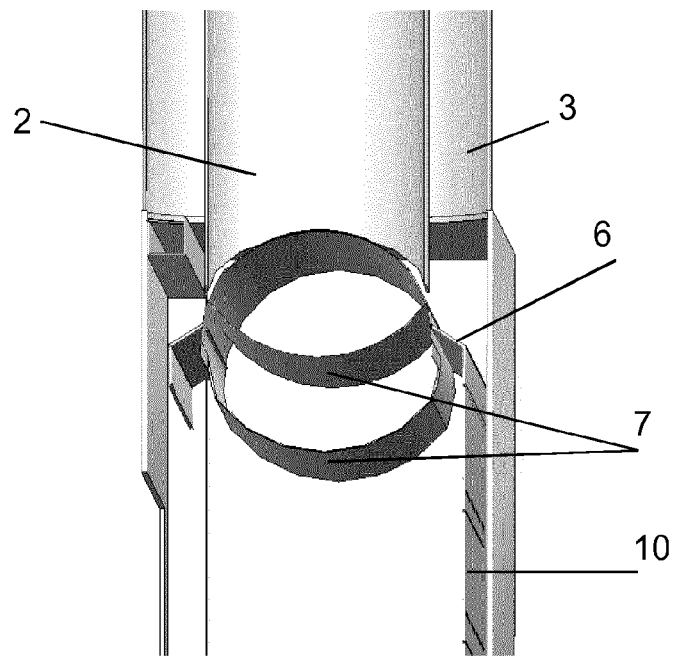
Figure 4C:
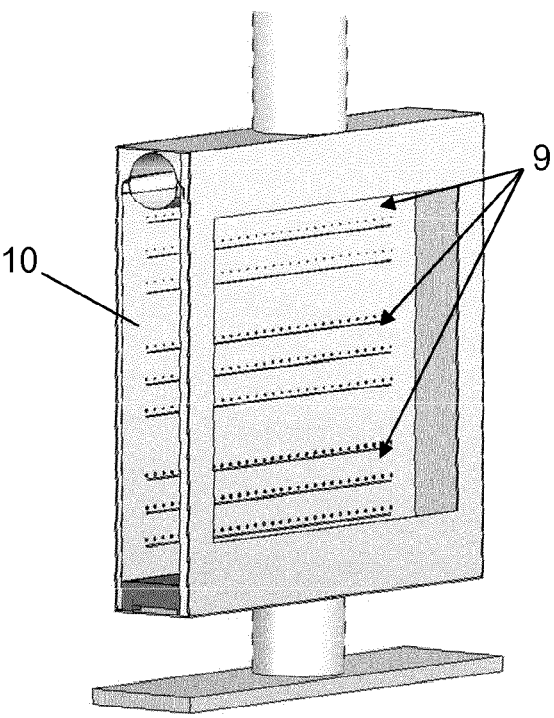

According to an alternative embodiment of the invention, for furnaces with a single window, as shown in FIGS. 4A to 4C, it is possible to extend the exchanger at the non-windowed back of the apparatus using a conductive box or plate 10, for example made from cast iron. This will advantageously comprise, for example, 3 rows of orifices 9 measuring 0.75 cm at the bottom, 0.5 cm at the middle and 0.25 cm at the top, these orifices being for example separated by 2.5 cm and the rows distributed over the height of the back 10. There is then a progressivity of the openings from top to bottom to promote good conveyance of the combustion air thus optimally preheated. Once again, these openings are preferably provided in the lower half of the furnace.

EXAMPLE 4

Figure 5A:
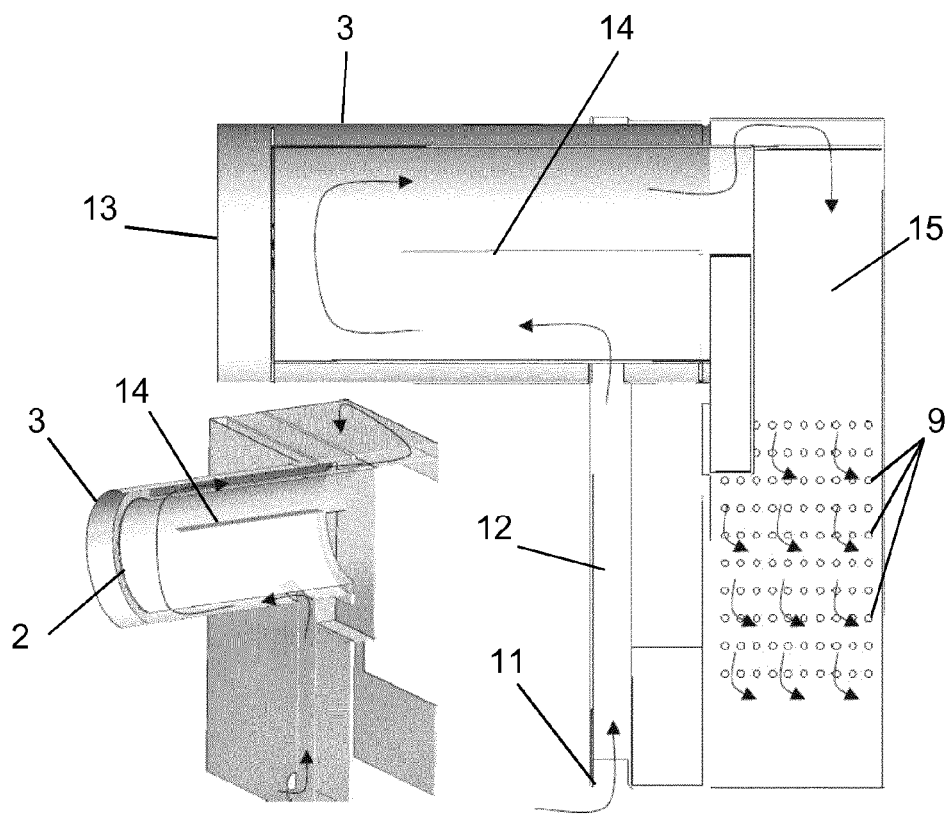
FIGS. 5A and 5B show views of an embodiment of the invention in the case where the apparatus comprises a single window and an opposite back with an intake for the combustion air in the bottom of the combustion chamber, the air rising in a central duct of the back as far as into an exchanger that is concentric with a first section of the discharge nozzle for the burnt gases, and descending through the side ducts with a supply of preheated air at the base of the combustion.
Figure 5B:
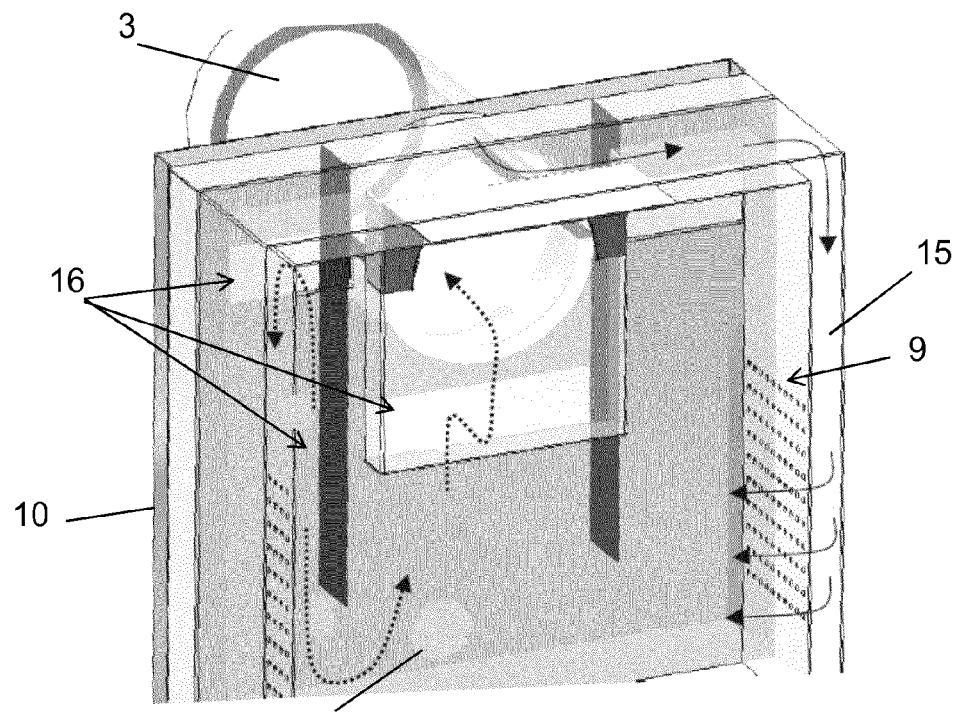

According to another embodiment of the invention shown in FIGS. 5A and 5B, in the case of an apparatus with a single window and provided with a back 10, the combustion air is introduced through a central opening 11 located in the bottom of the combustion chamber, in a controlled manner, for example using an automated register subjected to a regulating loop. The combustion air first reheats in a vertical duct 12, situated at the back of the apparatus, which brings it toward a chamber 3 that is concentric with the discharge duct for the burnt gases 2. Unlike the conveying duct for the combustion air considered in the above examples 1 to 3, this dual-enclosure duct 2 has a limited extension, preferably according to a length comprised between 20 and 40 cm. In FIGS. 5A and 5B, this duct is shown at the rear of the stove and perpendicular to the chamber, as in a suction stove, but the invention also relates to the case where the exhaust duct for the burnt gases is vertical.

The aforementioned concentric duct 3 allows to significantly increase the extension of the preheating enclosure, and therefore the heat exchange surface between the burnt gases and smoke on the one hand, the combustion air on the other hand. This duct comprises a lid 13 and two longitudinal partitions 14 that are diametrically opposite but do not extend as far as the lid 13. Thus, the path of the combustion air in that duct 3 occurs first in a first part of the half-cylinder dual enclosure, and next, after having passed the zone adjacent to the lid, in the second half-cylinder.

The combustion air, which is increasingly heated, is next conveyed from top to bottom in a dual enclosure 15 situated at the level of each lateral side of the heating apparatus. Each of the lateral walls of these two ducts 15 in contact with the combustion chamber is provided with orifices 9 preferably situated in the lower half of the combustion chamber. Still preferably, these orifices have a diameter that decreases from bottom to top. In particular, the orifices will be in the shape of holes or slots, and will preferably be positioned in horizontal rows situated at different heights, the distance between those rows being possibly variable. All of these parameters allow to vary the flow of combustion air.

Advantageously, the combustion chamber is also provided with ducts and baffles 16, for example in the form of a triple wall, to convey burnt gases and smoke (see patent application WO 2011/082936), which allows better heat exchange between the smoke and the combustion air to be preheated.

Thus, due to the presence of the concentric heat exchanger 3 at the height of the first part of the smoke-discharge duct 2, the temperature of the smoke itself and of the smoke ducts (either connected vertically, or in rear connection) is reduced, which increases the efficiency of the apparatus, and the air entering the combustion chamber is heated more relative to the configuration without an intake exchanger, which promotes the combustion proportionally while limiting polluting emissions.

The decrease in the smoke temperatures also advantageously allows to reduce the distance between the heating apparatus and the wall against which it is installed (clearance).

EXAMPLE 5

Figure 6A:
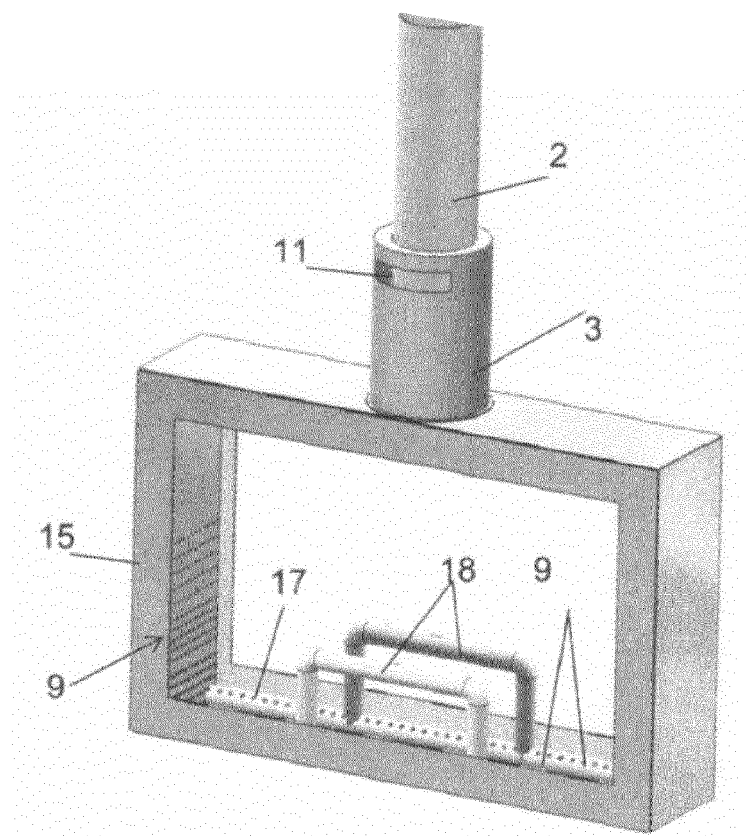
FIGS. 6A to 6C show views of an embodiment of the invention in the case where the apparatus comprises two windows facing each other, where the combustion air is admitted at the level of an exchanger that is concentric with a first section of the discharge nozzle for the burnt gases in connection with side ducts that bring the preheated air from top to bottom at the base of the combustion (vertical, horizontal orifices and/or fire-dogs).
Figure 6B:
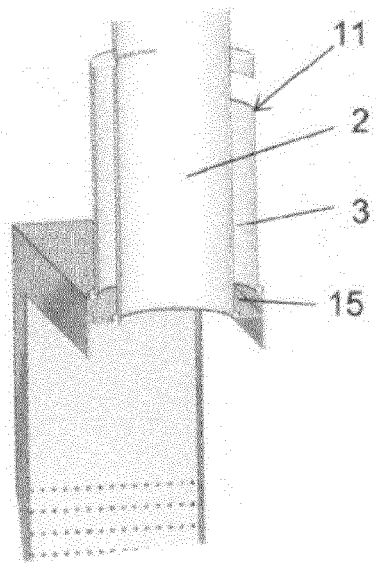

According to still another embodiment of the invention, as shown in FIGS. 6A and 6B, in the case of an apparatus with two windows facing each other, the combustion air is introduced through an orifice 11 formed at an easily-accessible height or within reach of the user in the concentric heat exchanger 3 at the level of the first part of the discharge duct for the burnt gases. Here, the heat exchanger is vertical, the smoke-discharge nozzle being vertical, whereas in example 4 above, the heat exchanger is horizontal, the smoke-discharge nozzle being horizontal.

The concentric exchanger 3 is connected to two dual-wall ducts 15 each descending along a side wall of the apparatus (as opposed to the front windowed faces).

Thus, the preheated air is conveyed to the bottom of the combustion chamber, where it is released by several rows of orifices 9 preferably situated in the lower half of the combustion chamber. Still preferably, these orifices have a diameter that decreases from bottom to top. Alternatively, the side ducts communicate in the bottom of the chamber with two tube-shaped ducts 17, provided with fire-dogs 18 for holding wood logs. These tubular ducts with their fire-dogs are also provided with orifices 9 for releasing preheated combustion air. The idea of completely surrounding the ember bed with orifices for supplying preheated air, as in example 2, is also found in this embodiment. The use of tubular fire-dogs provided with orifices further allows to place these orifices at different heights in front of the window, to best restore the above-described air-enveloping cone.

Figure 6C:
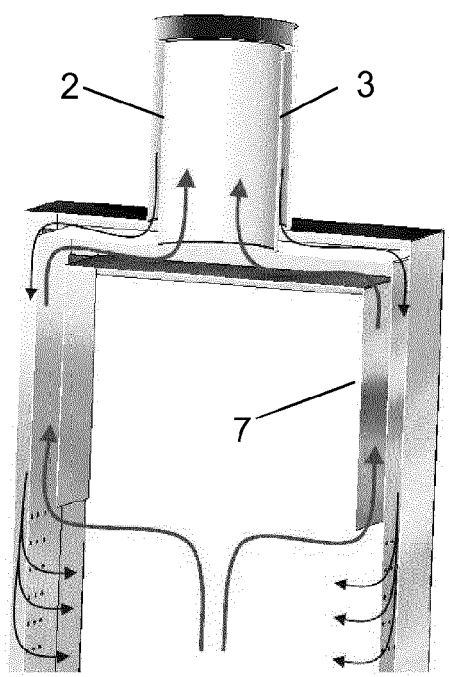

Alternatively and as illustrated in FIG. 6C, the discharge duct for the burnt gases 2 is extended in the crown of the combustion chamber to create a "rectangular" exchanger or baffle section 7, i.e. using a horizontal plate and two vertical plates, this exchanger section allowing to channel the smoke and combustion gases, preferably by capturing them at mid-height of the combustion chamber.

EXAMPLE 6

Figure 7A:
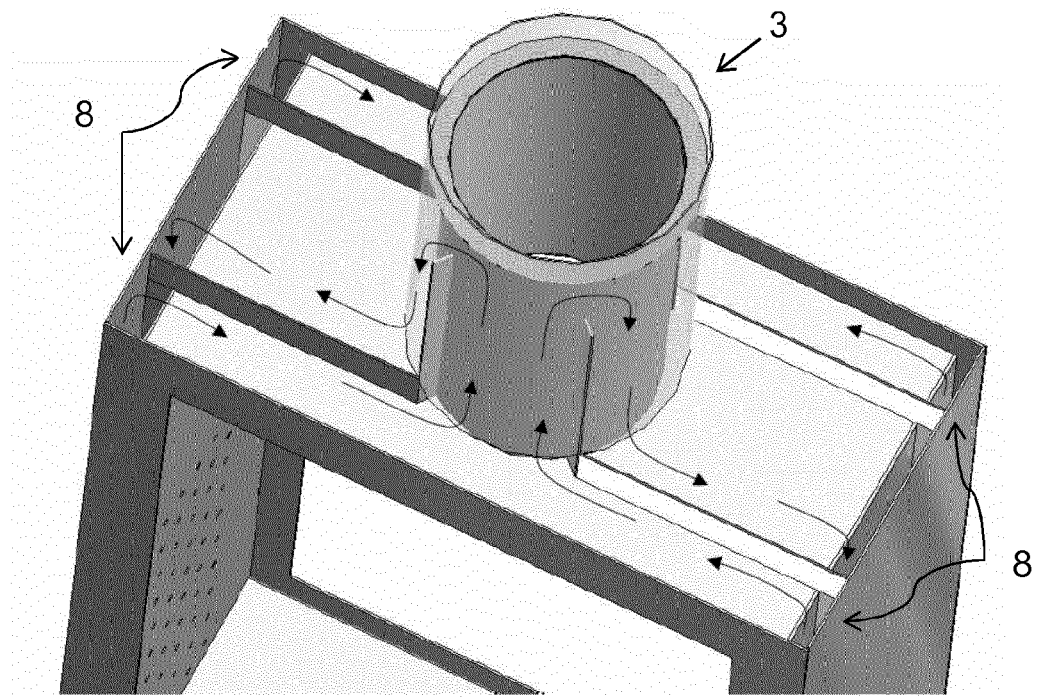
FIGS. 7A to 7C show views of an embodiment of the invention in the case where the apparatus comprises two windows facing each other, where the combustion air is taken in at the level of a dual bottom in the combustion chamber and then conveyed vertically through four ducts situated at the corners of the apparatus as far as into an exchanger that is concentric with a first section of the discharge nozzle for the burnt gases and descends through central ducts on the lateral sides, ultimately with a supply at the base of the combustion.
Figure 7B:
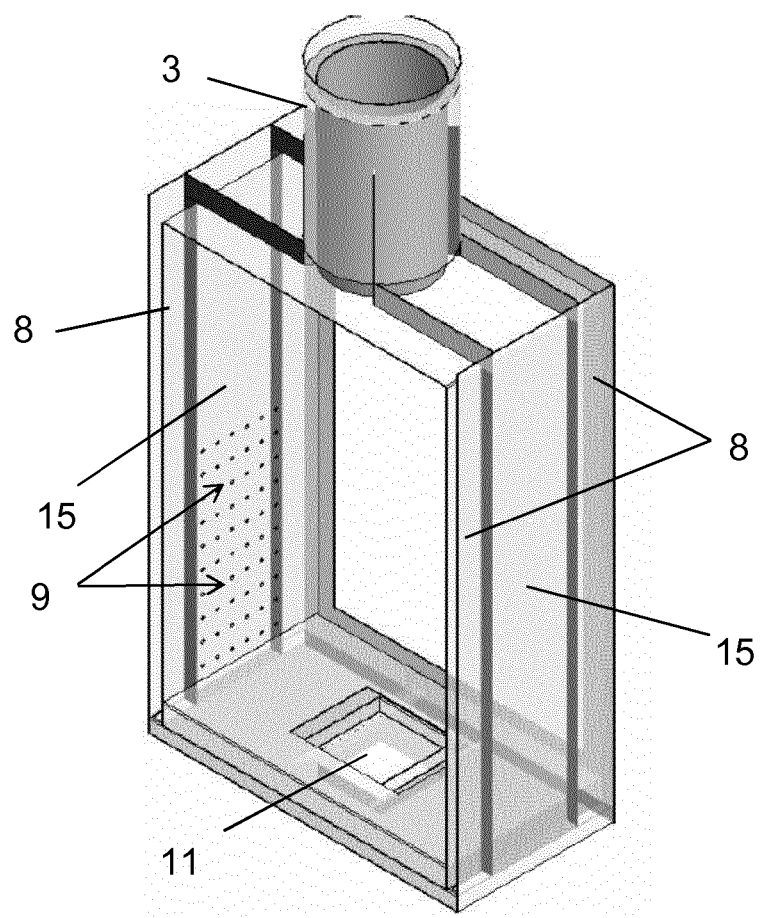
Figure 7C:
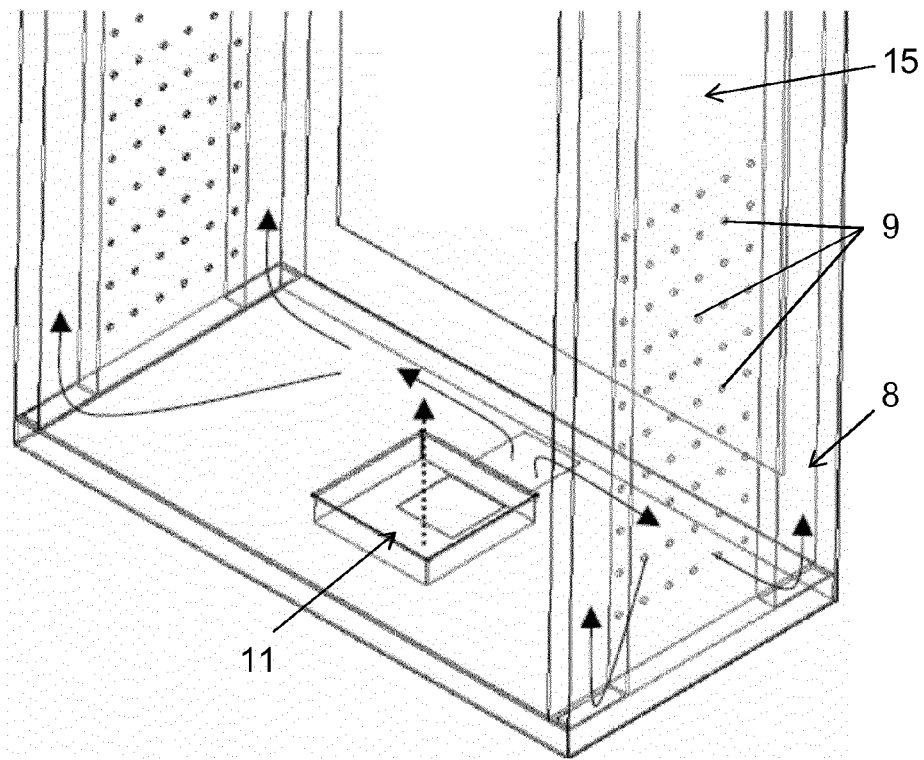

According to still another embodiment of the invention, as shown in FIGS. 7A to 7C, in the case of an apparatus with two windows facing each other, the combustion air is introduced below the grate situated in the bottom of the apparatus, then, via a dual bottom 19, conveyed into four vertical ducts 8 situated at the four corners or angles of the apparatus. These four ducts 8 are connected with the concentric heat exchanger 3 at the height of the first part of the smoke-discharge duct 2 (see above in example 4). From there, the air heated by its vertical path in the four aforementioned ducts 8 and by its path in the concentric heat exchanger 3 is next conveyed again downward in the two central side parts 15, each situated between two of the four aforementioned ducts 8. According to an alternative, only part of the corner ducts (1 to 3 ducts) may be used to preheat the air.

As above, each of the two walls of these two central side ducts 15 in contact with the combustion chamber is provided with orifices 9 preferably situated in the lower half of the combustion chamber. Still preferably, these orifices 9 have a diameter that decreases from bottom to top.

It will be noted that, if the apparatus comprises one single window, the back of the apparatus may also be used as a preheating duct, optionally in addition to one or several of the corner ducts, to convey the combustion air from bottom to top and to preheat it.

Figure 8A:
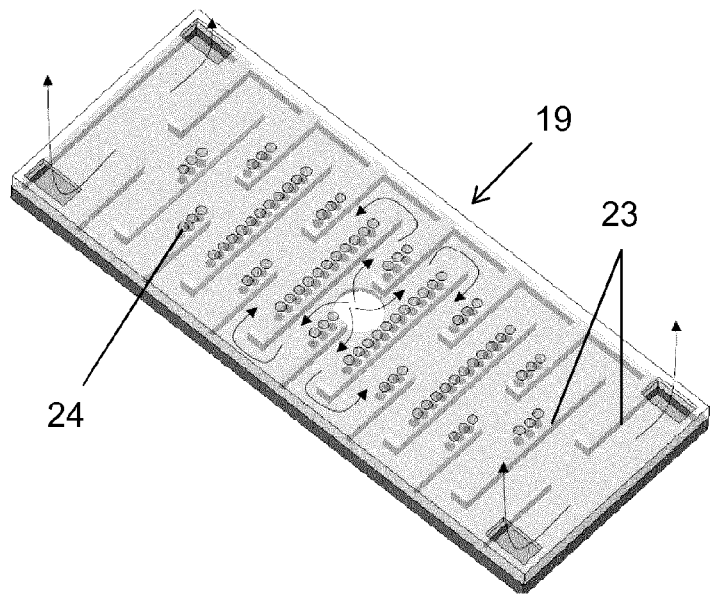
FIGS. 8A to 8C show views of a hollow grate with baffles allowing again additional preheating of the combustion air in the configuration of FIGS. 7A to 7C.
Figure 8B:
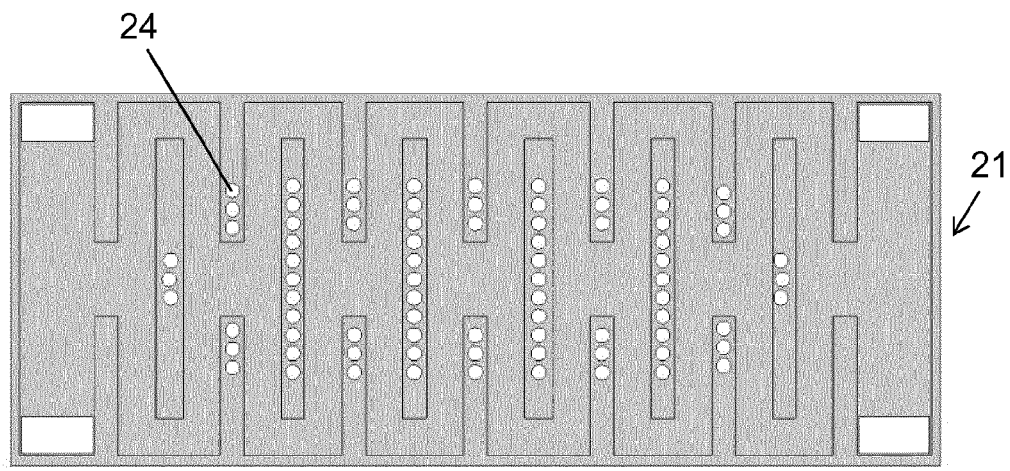
Figure 8C:
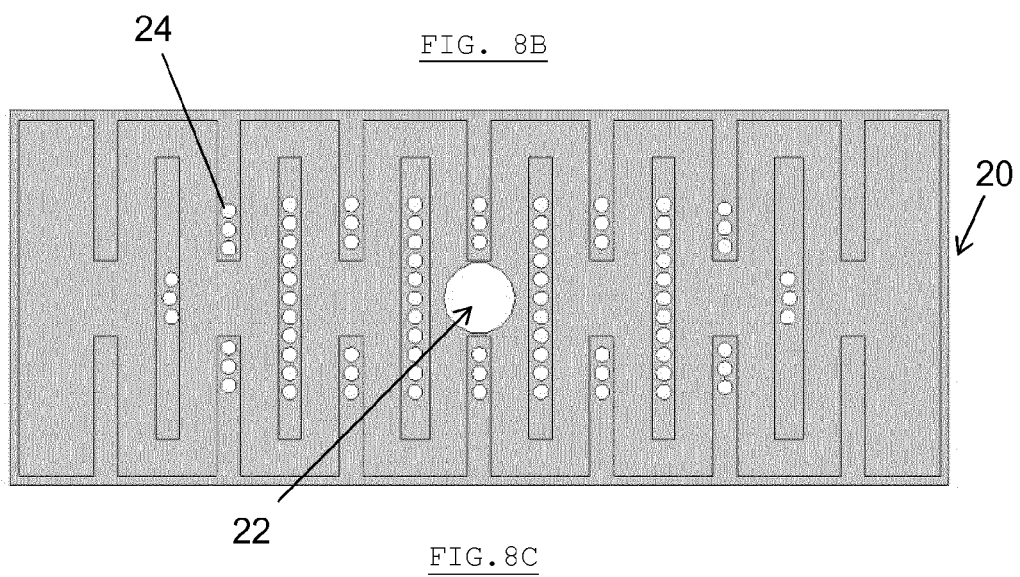

Advantageously, as shown as an alternative in FIGS. 8A to 8C, the incoming air can first be preheated in a hollow grate situated in the bottom of the chamber above the ash pan (not shown), the lower wall 20 of which is provided with an orifice 22 for the intake of outside air, and the closed upper wall 21 is in thermal contact with the combustion chamber. The hollow grate 19 is provided with baffles 23 aiming to lengthen the path of the combustion air inside it, and therefore to increase the heat exchange. The hollow grate 19 is provided with orifices 24 passing all the way through it in a sealed manner, such that the ashes can cross through it and fall into the ash pan, without contact with the combustion air.

The advantages of the configuration as in the invention are, for a same power, that the space and the raw materials required for manufacture are greatly reduced (up to 50%), as well as the required handling. For inserted furnaces, it is also possible to provide significantly less masonry.

EXAMPLE 7

According to one complementary alternative of the invention, wood logs may be loaded, in the case of a stand-alone stove as in the invention, from the top of each side of the smoke-discharge duct or from both sides of the stove (not shown). These loading arrangements will allow to eliminate the need to open the windowed door for loading. The latter will only need to be opened when the stove is no longer operating and well cooled, for window cleaning or upkeep purposes. In use, the window will remain clean even at a low rating due to the fact that the combustion air is greatly preheated and literally envelops the combustion gases. It was also observed that, owing to this highly improved combustion, it is possible, using the stove as in the invention, to burn soft woods such as pine, which is at least only half the cost of noble wood.

When it is inserted into masonry, the heating apparatus as in the invention will, alternatively, also allow to load wood logs from the sides of the stove, for example using a pivoting assembly of the heating body.

Given the very small thickness provided for the combustion chamber (for example, 12-20 cm), it is necessary to provide a method for positioning the wood logs height wise, for example using rails, angle brackets, etc. (not shown). In fact, this allows to prevent the logs from sticking against the window(s) of the heating apparatus.

EXAMPLE 8

According to still another complementary alternative of the invention, the problem of smoke escaping because of the opening of the door can be solved, while avoiding the side loading described above, by opting for a simple vermiculite baffle (not shown), which covers the furnace crown over its entire length and with the exception of its rear part: the flames are attracted toward the rear of the furnace and the smoke does not escape through the windowed door when it is opened. If the stove has two windows, the baffle will advantageously be made sliding and will optionally be moved when one wishes to open one of the doors to clean the window, for example.

EXAMPLE 9

According to still another complementary alternative of the invention, the stove may alternatively be equipped with an additional air intake situated in the bottom of the apparatus. This may prove particularly useful to amplify the fire or accelerate the combustion of the embers that accumulate at the end of the combustion cycle of the wood. With the aim of allowing a rational accumulation of ashes, the bottom part of the stove is blind. In order to prevent the ashes from spreading on the window, it is important for the window and the blind volume to be in the extension of one another. In this lower part, or below it, there may be an ash pan that allows to remove the ashes generated by the combustion (not shown).

Advantageously, the ash pan positioned in the bottom part of the stove will be covered by several crosspieces or a grate. The paper and ignition kindling may then be positioned in the ashcan, the first log next being placed on those crosspieces or that grate. The ash pan may also advantageously be provided with an orifice for adapting an ash vacuum (not shown).

Another advantage that may be mentioned for the present invention relates to the alternatives of stoves with an exchanger to produce hot water. With the apparatus of the invention, the combustion is completed when the combustion gases come into contact with the water pouch or the water tubes situated in the crown of the furnace. Thus, the "cold" mass formed by the water pouch (at less than 100° C.) does not disrupt the combustion (for example at approximately 400° C.), as in the apparatuses of the state of the art, where a good part of the combustion occurs in the crown of the furnace.

Still another advantage of the invention is related to the supply of preheated air exclusively from the top of the apparatus. With the supply of combustion air as in the state of the art only from the bottom, without reloading, the combustion is extinguished after a fairly limited length of time. With the supply with combustion air as in the state of the art both from the bottom (primary air) and from the top (preheated secondary air), the duration of the combustion is longer and the user is advised to place the apparatus in idle mode to extend the duration of the combustion. In actuality, the user often adjusts to idle much too quickly, which causes dirtying of the glass. The supply of preheated combustion air only from the top, as in the invention, does not exhaust the ember bed, since no air crosses through it. The latter therefore remains much longer and idle adjustment is no longer necessary.

REFERENCE SYMBOLS 1 heating apparatus
2 discharge duct for burnt gases
3 concentric duct for preheating primary air
4 window
5 heat exchanger at air intake
6 outer surface of exchanger
7 baffle(s)
8 vertical tubular ducts
9 intake orifice for preheated air
10 back
11 intake device for combustion air
12 vertical preheating duct (rising)
13 lid of concentric preheating duct
14 partition of concentric preheating duct
15 vertical preheating duct (descending)
16 ducts and baffles for burnt gases
17 horizontal tubular ducts
18 fire-dogs
19 hollow grate
20 lower wall of hollow grate
21 upper wall of hollow grate
22 grate orifice
23 grate baffles
24 orifices for ashes

The invention claimed is:

1. A solid-fuel heating apparatus (1) comprising a combustion chamber provided with a windowed door (4) opening to the outside, an intake device (11) for receiving outside combustion air in said chamber, an output duct (2) for the burnt gases and a sealed enclosure for preheating the combustion air and conveying the latter into the combustion chamber, said sealed enclosure having a first end connected to the intake device (11) and a second end having a plurality of orifices (9) releasing the air preheated through the pre-heating enclosure into the combustion chamber, the preheating enclosure being made up of a set of sealed ducts and exchanging heat with the combustion gases and the burnt gases (3,8,12,15,17,18,19), ending with the aforementioned orifices (9), wherein said orifices (9) are positioned in horizontal lines spaced apart from one another and have a size decreasing with their height from the bottom of the combustion chamber, over a distance that does not exceed the lower half of the height of the combustion chamber, so as to modulate the flow of preheated air released into the chamber while enveloping the flame and combustion area according to the natural conical shape of the flame, and wherein the set of sealed ducts exchanging heat with the combustion gases and the burnt gases is arranged to comprise a duct section (3) for preheating the combustion air that is concentric with at least one section of the discharge duct for the burnt gases (2) between a first end adjacent the combustion chamber and a second end located outside the combustion chamber and has a length comprised between 20 and 40 cm.

2. The solid-fuel heating apparatus as in claim 1, wherein the concentric section of the preheating duct (3) comprises an upper or end lid (13) and at least two radial partitions (14) with an opening between the end of those partitions and the lid, to create at least two cylindrical enclosure sections such that the combustion air is oriented upwards, or in one direction, in a first of said sections, runs alongside the lid, then is oriented downward, or in the opposite direction, in another of said sections, while heating in thermal contact with the discharge duct (2) for the burnt gases.

3. The solid-fuel heating apparatus as in claim 1, wherein the concentric section (3) of the preheating duct comprises the intake device for the combustion air (11) taken from inside or outside of an ambient room or the residence and is connected to a dual-enclosure section (15) at the level of non-windowed sides of the apparatus to convey the combustion air from top to bottom while continuing to preheat it until it is taken in at the bottom of the combustion chamber by said orifices (9).

4. The solid-fuel heating apparatus as in claim 3, wherein, in the bottom of the combustion chamber, the dual-enclosure section (15) is further connected to horizontal tubes (17), optionally provided with fire-dogs (18) that are also tubular, said tubes (17) and fire-dogs (18) also being provided with intake orifices (9), in order to bring the preheated air into an ember bed.

5. The solid-fuel heating apparatus as in claim 1, comprising a back (10) and a opposite windowed face (4), wherein the intake device for the combustion air (11) is situated in the bottom of the combustion chamber and is connected to a vertical preheating duct (12) situated in the back (10) of the apparatus that brings in the combustion air upwards toward said concentric section of the preheating duct (3), from which the combustion air is oriented toward at least one dual-enclosure section (15) at the level of at least one of the two lateral sides of the apparatus to next convey the combustion air downwards while continuing to preheat it until it is taken in the combustion chamber through said orifices (9).

6. The solid-fuel heating apparatus as in claim 5, wherein the apparatus further comprises a plurality of ducts and baffles (16), to increase the length of the path taken by the burnt gases and smoke before they are discharged, in order to decrease the temperature of the smoke and increase the heat exchange with the combustion air.

7. The solid-fuel heating apparatus as in claim 1, comprising two opposite windowed faces (4) or a back (10) and an opposite windowed face (4), wherein the intake device for the combustion air (11) is situated in the bottom of the combustion chamber and is connected, via a sealed dual-bottom duct (19), to one or several vertical preheating ducts (8) situated at respective corners of the apparatus and optionally to a preheating duct formed in the back (10) of the apparatus, said ducts bringing in the combustion air upwards toward said concentric section of the preheating duct (3) from which the combustion air is oriented toward two dual-enclosure sections (15) at the level of the two respective lateral sides of the apparatus to next convey the combustion air downwards while continuing to preheat it until it is taken into the combustion chamber through said orifices (9), each of the dual-enclosure sections (15) optionally being in a central position between two respective rising vertical ducts (8).

8. The solid-fuel heating apparatus as in claim 7, wherein the sealed dual-bottom duct (9) is a hollow grate comprising a lower wall (20) provided with an intake orifice (22) for the combustion air, a closed upper wall (21) in thermal contact with the combustion chamber, the inside of the hollow grate comprising baffles (23) to lengthen the path of the combustion air in the hollow grate, orifices (24) passing all the way through the hollow grate in a sealed manner in order to allow the ashes to fall into an ash pan.

9. The solid-fuel heating apparatus as in claim 1, wherein the apparatus has an essentially parallelepiped shape, with a length/depth ratio at least greater than 3 or a width/depth ration at least greater then 3, and a windowed surface covering at least 70% of the face with the larger surface area.

10. The solid-fuel heating apparatus as in claim 1, wherein the discharge duct (2) for the burnt gases is extended in the crown of the combustion chamber to create a rectangular exchanger or baffle section (7), i.e., using a horizontal plate and two vertical side plates, this exchanger section (7) allowing to channel the smoke and combustion gases, by capturing them at mid-height of the combustion chamber.

* * * * *